United States Patent
Jose

(10) Patent No.: US 9,213,816 B2
(45) Date of Patent: Dec. 15, 2015

(54) PROTOCOL FOR BIOMETRIC DEVICE CAPTURE AND QUALITY ANALYSIS

(71) Applicant: Subhash Jose, Bangalore (IN)

(72) Inventor: Subhash Jose, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/847,077

(22) Filed: Mar. 19, 2013

(65) Prior Publication Data
US 2014/0176983 A1    Jun. 26, 2014

(30) Foreign Application Priority Data
Dec. 24, 2012    (IN) ............................ 3989/DEL/2012

(51) Int. Cl.
| | |
|---|---|
| *G06F 15/00* | (2006.01) |
| *G06F 21/32* | (2013.01) |
| *G06F 21/45* | (2013.01) |
| *H04L 29/06* | (2006.01) |

(52) U.S. Cl.
CPC ................ *G06F 21/32* (2013.01); *G06F 21/45* (2013.01); *H04L 63/0861* (2013.01)

(58) Field of Classification Search
CPC .................................................. H04L 63/0861
USPC ........................................................ 358/1.14
See application file for complete search history.

(56) References Cited

U.S. PATENT DOCUMENTS

| | | | | |
|---|---|---|---|---|
| 2009/0077546 | A1* | 3/2009 | Huang ..................... | G06F 8/316 717/165 |
| 2013/0290508 | A1* | 10/2013 | Besehanic et al. ............ | 709/224 |

* cited by examiner

*Primary Examiner* — Saeid Ebrahimi Dehkordy
(74) *Attorney, Agent, or Firm* — Robert P. Marley

(57) ABSTRACT

Systems and methods are disclosed herein to a computer-implemented method for communicating with peripheral devices comprising loading, by a computer, a configuration file specifying supported peripheral devices and defining commands for each supported peripheral device; receiving, by a computer, a selection of one of the supported peripheral devices from a list of peripheral devices presented in an interface; calling, by a computer, a device handler for the selected peripheral device; invoking, by a computer, protocols for the selected peripheral device that are specified by the device handler corresponding to the selected peripheral device; and sending, by a computer, commands entered through the interface to the selected peripheral device using the invoked protocols of the device handler corresponding to the selected peripheral device.

21 Claims, 4 Drawing Sheets

PROTOCOL FOR BIOMETRIC DEVICE CAPTURE AND QUALITY ANALYSIS

TECHNICAL FIELD

The present invention relates generally to communication between a computer system and peripheral devices, and more particularly, to a system capable of capturing biometric images from a plurality of peripheral devices.

BACKGROUND

Business and governments have a strong need for access control, which is a way of controlling which people may have access to restricted areas, items, or data. Secure access control provides access only to authorized personnel and prevents access to unauthorized personnel. For example, a business may desire that only high ranking management employees have access to confidential data. As another example, governments may seek to control their boarders using access control techniques to prevent access to the country to certain people. In either situation, an access control technology solution greatly assists in securing important areas and assets.

Access control generally implements someone or something to identify individuals seeking access to the protected areas, items, or data. Many conventional methods of identification exist. For example, a person seeking access could provide identification documentation to a security guard, enter a personal identification number into a computer terminal, or carry a digital token, or some combination of these identification methods. Each of these conventional identification verification methods have strengths and weaknesses. Depending on a business or government's business requirements, these conventional identification verification methods may lack the security levels necessary to create a highly secure environment.

To enhance security, technology based identification methods have been introduced. Biometrics offer very high security and are becoming a common method of identification verification. Biometric systems analyze identifiable characteristics of a person such as fingerprints, irises, and faces to perform identification or identity verification because characteristics like irises, faces, and fingerprints are unique to each person. Biometrics systems can identify a person or verify an identity using captured images of the person's identifiable characteristics. For example, a biometric identification solution may capture an image of a person's face, irises, or fingerprints in order to identify a person requesting access to a restricted resource. Subsequently, the biometric identification solution compares the captured image with a template biometric image, which the biometric identification solution created when the person enrolled in the biometric identification solution. Using a matching algorithm and a confidence threshold, the biometric identification solution determines whether a match exists between the captured image and a template and whether to allow access to the restricted resource.

Many biometric systems connect cameras or scanners to perform identification or identity verification of a person interacting with the biometric system. If a non-visual biometric is to be captured, then a biometric system may implement another type of peripheral device, such as a microphone if voice data is to be collected. In either cases, many different vendors create many different peripheral devices that can be used as part of a biometric solution. These peripheral devices can be sophisticated, such as peripheral devices capable of forming a 3-D rendering of a human face, or simpler, such as a common web camera.

Depending on the scale of the biometric system, the number of supported peripheral devices may be quite high. For example, if a government wants all its citizens to enroll in an electronic passport program, which stores biometric data on a smart card within the electronic passport, many different peripheral devices may need to be supported and implemented because of budget restraints and the large scale of the program. In just about any situation, it is desirable to support multiple vendor peripheral devices.

For each peripheral device, a device framework is designed and coded so that the biometric system can communicate with the peripheral device. Creating a device framework takes a great deal of work by a software engineer, and the software engineer may write 100's or 1000's of lines of code in order to support a new peripheral device and implement all its supported functions. As the number of supported peripheral devices increases, the amount time spent by the software engineer drastically increases. Also, the device framework for one peripheral device may not run on the same platform as another peripheral device. Thus, an engineer or engineering team needs to be well-versed in many different technology platforms.

Thus, a system that provides for peripheral device integration without overly burdening software engineers is desired. Also desired is a biometric protocol that quickly and easily integrates many peripheral devices while remaining user-friendly.

SUMMARY

The systems and methods described herein attempt to overcome the drawbacks discussed above by creating a device framework layer that interacts with an interface and calls device handlers. The interfaces allows a user to interact with the device framework layer. The device framework layer dynamically calls the device handlers depending on which device the user has selected. Once the device handler has been dynamically called and invoked by the device framework, the device framework sends commands to the handlers, and the handlers implement the proper protocol to execute the command on the peripheral device. The handlers are device specific, but the device framework is easily configurable so that the functionality of the peripheral devices can be achieved without creating a unique framework and protocol for each supported peripheral device. The device framework configures quickly to add new peripheral devices or new functionality to the peripheral devices.

According to the exemplary embodiments herein, adding a new supported device may be accomplished through relative easy and quickness. Configuring the device framework layer and providing a location to the device handler allows the device framework to use a new peripheral device to capture images.

In one embodiment, a computer-implemented method for communicating with peripheral devices comprises loading, by a computer, a configuration file specifying supported peripheral devices and defining commands for each supported peripheral device; receiving, by a computer, a selection of one of the supported peripheral devices from a list of peripheral devices presented in an interface; calling, by a computer, a device handler for the selected peripheral device; invoking, by a computer, protocols for the selected peripheral device that are specified by the device handler corresponding to the selected peripheral device; and sending, by a computer, commands entered through the interface to the selected peripheral device using the invoked protocols of the device handler corresponding to the selected peripheral device.

In another embodiment, a computer program product, comprising a computer usable medium having a computer readable program code embodied therein, said computer readable program code adapted to be executed to implement a method for communicating with peripheral devices, said method comprises providing a system, wherein the system comprises distinct software modules, and wherein the distinct software modules comprise an interface module, a device framework module, and a device plug-in module, and wherein the device plug-in module comprises a plurality of device handlers for communicating with a plurality of supported peripheral devices; parsing, by the device framework module, a configuration file that specifies all the supported peripheral devices and defines commands for each supported peripheral device, wherein the parsing of the configuration file generates a list of the supported devices that is provided to the interface module; displaying, by the interface module, the list of the supported peripheral devices on a display connected to the system so that a user may select one of the supported peripheral devices for communication between the system and the selected peripheral device; receiving, by the interface module, a selection of one of the supported peripheral devices in the list, wherein the received selection is sent to the device framework module; searching, by the device framework module, the configuration file to find a location in the computer usable medium of the device handler corresponding to the selected peripheral device; calling, by the device framework module, the device handler corresponding to the selected peripheral device from the device plug-in module using the location specified in the configuration file; invoking, by the device framework module, protocols for the selected peripheral device that are specified by the device handler so that the device framework module can communicate with the selected peripheral device; receiving, by the interface module, commands to perform functions of the selected peripheral device, wherein the commands received are sent to the device framework module; and sending, by the device framework module, the commands to the selected peripheral device based on the invoked protocols included in the device handler corresponding to the selected peripheral device.

In another embodiment, a biometric system comprises a plurality of peripheral devices for capturing measurable characteristics of people for biometric identity recognition; and a computer system comprising a computer readable medium configured to: load a configuration file specifying supported peripheral devices and defining commands for each supported peripheral device; receive a selection of one of the supported peripheral devices from a list of peripheral devices presented in an interface; call a device handler for the selected peripheral device; invoke protocols for the selected peripheral device that are specified by the device handler; and send commands entered through the interface to the selected peripheral device using the invoked protocols of the device handler corresponding to the selected peripheral device.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Reference will now be made in detail to the preferred embodiments, examples of which are illustrated in the accompanying drawings. The embodiments described above are intended to be exemplary. One skilled in the art recognizes that numerous alternative components and embodiments that may be substituted for the particular examples described herein and still fall within the scope of the invention.

Figure 1:
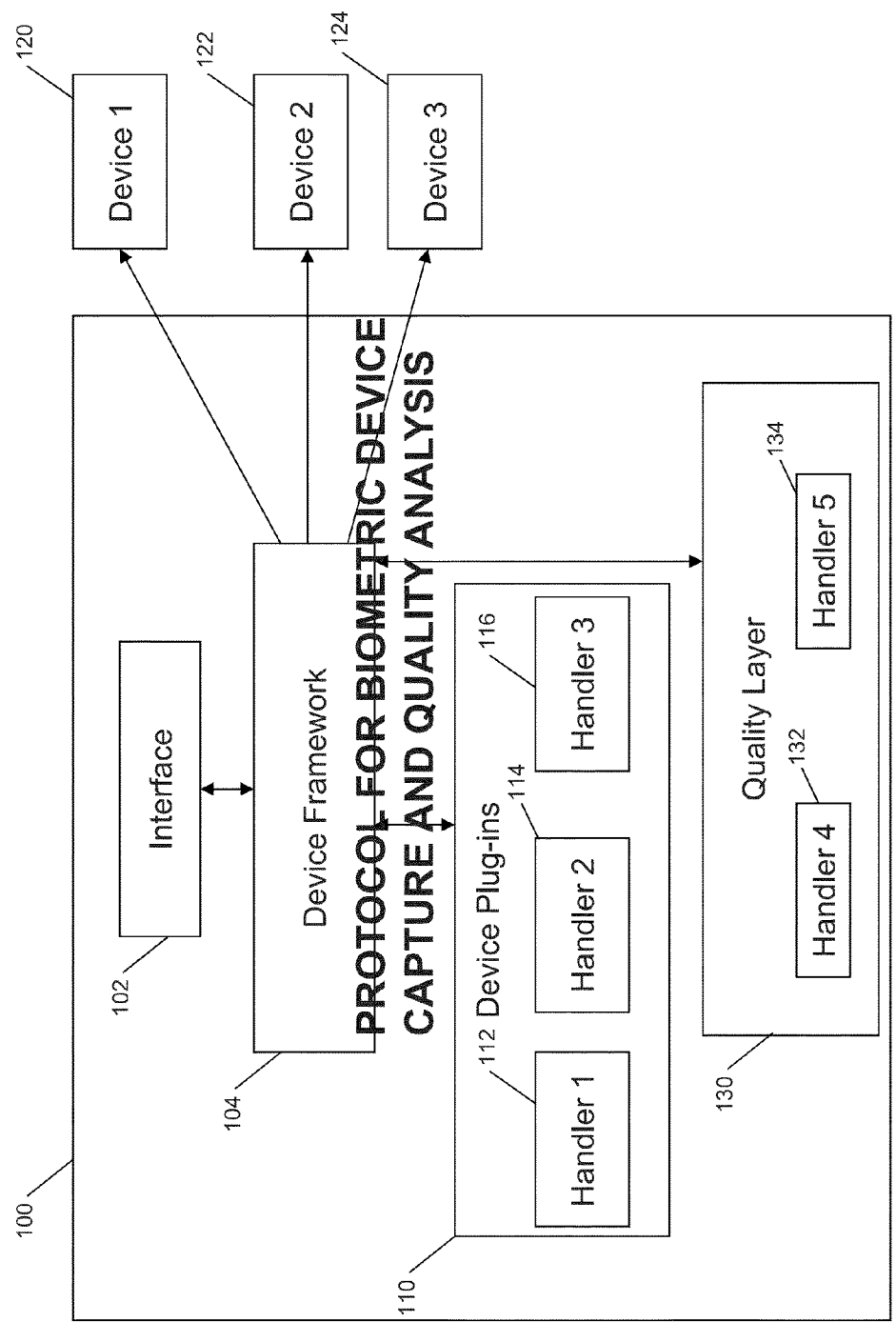
FIG. 1 illustrates a system diagram of a biometric device protocol according to an exemplary embodiments.

Referring to FIG. 1, a system diagram of a biometric device protocol is illustrated. As shown in FIG. 1, a computer system 100 includes an interface 102, a device framework layer 104, and a device plug-ins layer 110. The computer system 100 connects to a first, second, and third peripheral device 120, 122, 124. The device plug-in layer 110 includes first, second, and third device handlers 112, 114, 116 that respectively correspond to the first, second, and third peripheral devices 120, 122, 124. The computer system 100 connects to the peripheral devices 120, 122, 124 according to any digital connection means, such as, but not limited to, a universal serial bus (USB), a parallel communication interface, a serial communication interface, Firewire, Bluetooth, IEEE 802.11, or any other wired or wireless communication means. Although not illustrated, the computer system further includes electronic components typically included in a computing device such as a processor, memory, a data storage medium, an internal data bus, a network connection, a display, and a user input device, such as a keyboard or a touch screen. The interface 102, the device framework layer 104, the device plug-in layer 110, and the handlers 112, 114, 116 may be stored in the memory or data storage medium of the computer system 100 and implemented by the processor to provide the computer system 100 with the desired functionality.

The computer system 100 further includes an operating system. For example, the operating system may be the Windows® operating system, however the computer system 100 may execute any operating system that communicates with the ActiveX framework.

The computer system 100 may be connected to a biometric identity recognition system, or the computer system 100 may be programmed to perform biometric identity recognition. The computer system 100 may also be a general purpose computer that is fully configurable to perform many tasks, and the computing system 100 is not limited to biometric identity recognition or connection to a biometric systems. The exemplary embodiments will describe the computer system 100 as involved in biometric identity recognition for illustration purposes, but the exemplary embodiments herein may be applied to any computer system communicating with any peripheral devices, not just those computers systems and devices for biometric identity recognition. For example, the computer system 100 may be used to enroll individuals in a biometric identity recognition system. Alternatively, the computer system 100 may be used to verify the identity of an individual already enrolled in the biometric identity recognition system.

As described above, the computer system 100 may perform biometric identity recognition functions, such as enrollment, identification, or identity verification. The peripheral devices 120, 122, 124 may capture biometric information about people and send the biometric information to the computer system 100. For example, the peripheral devices 120, 122, 124 may be digital photo cameras configured to capture an image of an individual for enrollment purposes. The peripheral devices 120, 122, 124 may capture an image of an individual's face, an individual's irises, an individual's fingerprints, or any other visual features. The peripheral devices 120, 122, 124 may be other types of devices that capture images of an individual's features, such as a scanner, a video camera, a web camera, an infrared camera, or any other type of peripheral device configured to capture biometric images. If another type of biometric feature is to be captured, such a voice signature, the peripheral devices 120, 122, 124 may be microphones or other audio pickup equipment. The peripheral devices 120, 122, 124 may be any type of device configured to capture a biometric feature of an individual.

The same or different vendors may manufacture the peripheral devices 120, 122, 124. Also, the peripheral devices 120, 122, 124 may communicate with similar or different communication protocols. For example, the first and second peripheral devices 112, 114 may run on a java platform, while the third peripheral device 116 may run on a different platform. In a conventional computer system, as the number of connected peripheral devices grows, the number of different device drivers that the computer system 100 required to communicate with all the connected peripheral devices also increases.

Figure 3:
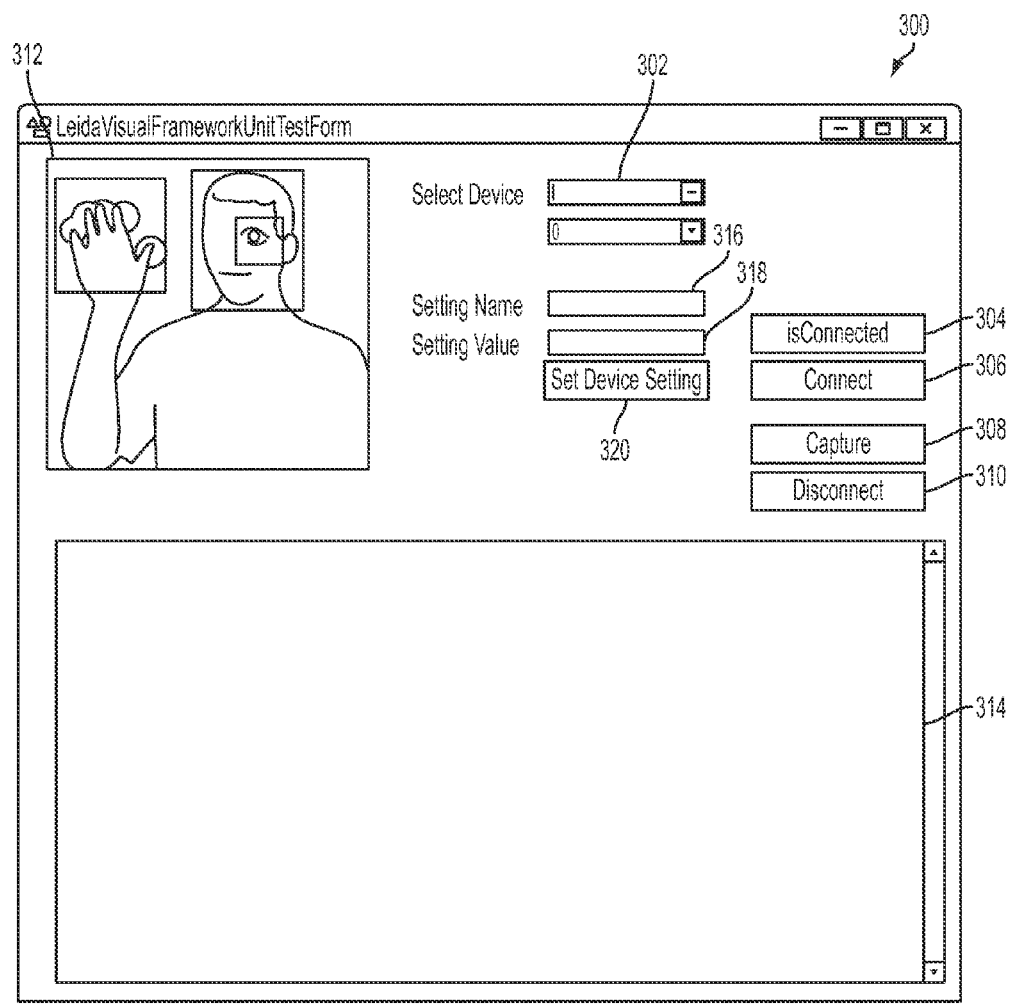
FIG. 3 illustrates a screenshot of an interface running in an operating system according to an exemplary embodiment.
Figure 4:
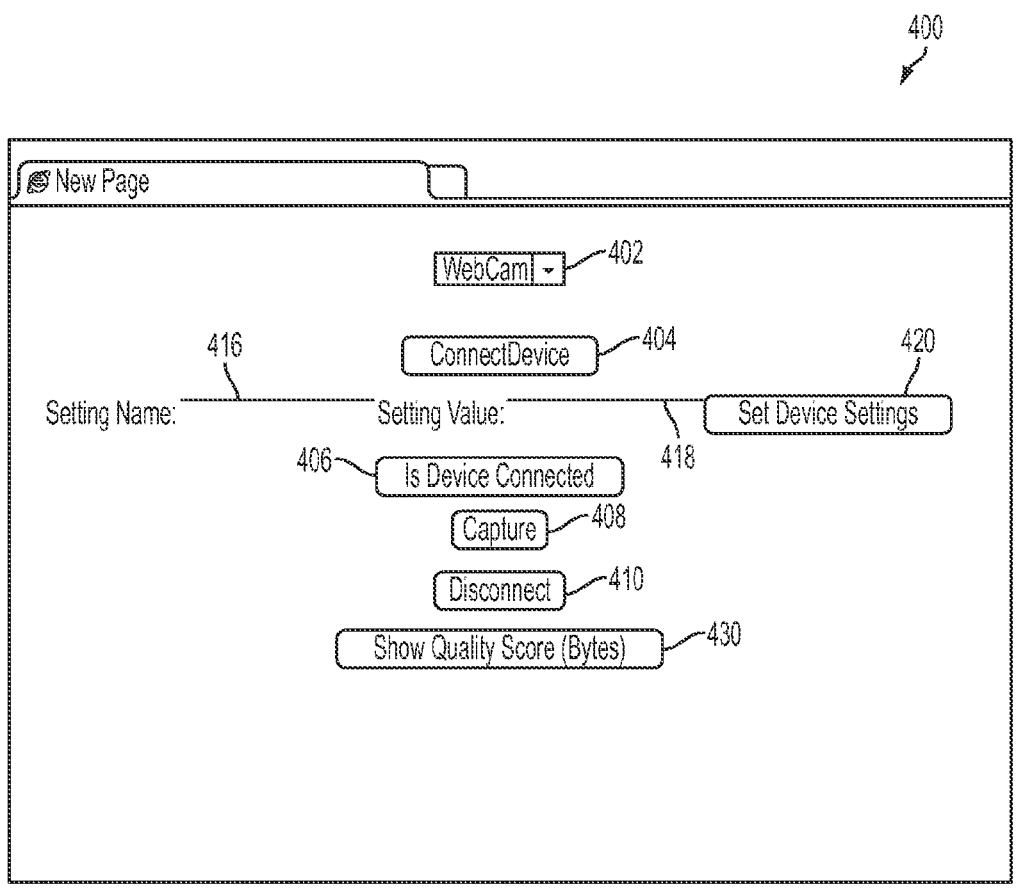
FIG. 4 illustrates a screenshot of an interface running as a web application according to an exemplary embodiment.

The interface 102 presents itself to the user, and the user may input commands into the interface 102 commanding the peripheral devices 120, 122, 124 to perform functions, like capture an image. Examples of the interface 102 are illustrated in FIGS. 3-4, which will be described in detail later. The interface 102 presents buttons, text boxes, and menus for user input and objects to display feedback to the user. For example, the interface 102 may have a capture image button that commands a connected peripheral device 112 to capture a photograph of a person's face. After capturing the image, the connected peripheral device 112 returns the captured image to the computer system 100, and the interface 102 displays the captured image to the user in an object of the interface 102.

The captured image may be included in a JSON object when returned to the computer system 100 so that it can be understood by multiple technologies. The capture image command applied from the Device Framework 104 may be understood and used across multiple frameworks, languages, and platforms. For example, the capture image command not only instructs one of the peripheral devices 120, 122, 124 to capture an image, but the device framework 104 can receive the captured image as a JSON object so that images captured by the device framework 104, which may be a .NET layer, can also be understood in Java, ActiveX, or a J2EE application without significant data translation or manipulation. The requirement that the captured image be included in a JSON object is wrapped together with the capture image command.

The interface 102 shall at least include a menu or button for selecting one peripheral device 112 to control. The computer system 100 may only have one peripheral device 112 connected, but the interface may have the ability to communicate with many different peripheral devices 120, 122, 124. So, a list or menu of possible peripheral devices 112, 114, 116 may be presented to a user, and the user can select which peripheral device 112 to control from the list. The interface 102 may confirm that the user selected peripheral device 112 is connected to the computer system 100 before sending any commands to the user selected peripheral device 112.

Included in the interface 102 is the ability to stream images from a connected camera, if a camera is one of the peripheral devices 120, 122, 124. The streaming images can be displayed in an embedded object in the interface 102 to the user. This streaming functionality may be implemented through the ActiveX framework.

The computer system 100 implements the device framework 104, and the user can send commands to the device framework 104 through the interface 102. The device framework 104 includes commands, properties, and configurations that the computer system 100 uses to control the peripheral devices 120, 122, 124. For example, the device framework 104 defines a set of commands that the peripheral devices 120, 122, 124 can perform. These commands may be presented by the interface as buttons or menus. The set of command may be configurable within the device framework 104. The set of commands may be all or a subset of all of the possible commands that the peripheral devices 120, 122, 124 understand. For example, if one of the peripheral devices 120 is a camera, the subset of commands may be a connect command to connect the peripheral device 120 to the computer system, a capture command to capture an image, and a disconnect command to disconnect the connection between the computer system 100 and the peripheral device 120. Additional commands may be provided as well, as specified by the device framework 104. Continuing the camera example, the device framework 104 may command the camera to pan left or right, and zoom in or out.

The device framework 104 also communicates with the device plug-in layer 110 to dynamically call one of the device handlers 112, 114, 116. Each of the device handlers 112, 114, 116 corresponds to a specific peripheral device 120, 122, 124, and each device handler 112, 114, 116 contains libraries or data to communicate with the peripheral devices 120, 122, 124.

The configuration of the device framework 104 may be encoded in XML. However, the dynamic calling of the device handlers 112, 114, 116 and the commands given to the device handlers 112, 114, 116 may be executed in the ActiveX framework. The ActiveX protocol loads the XML file to find all of the supported peripheral devices 120, 122, 124. Included in the XML file is a pointer telling the device framework 104 where device handlers 112, 114, 116 are located in the memory. When commanded, the device framework 104 loads the requested device handler 112, 114, 116 and plugs the device handler into the device framework 104. In other words, the device framework 104 looks to the XML configuration file to find the requested device handler 112, 114, 116, and the device framework 104 invokes the device handler 112, 114, 116 to achieve the desired functionality of the peripheral devices 120, 122, 124. The commands provided from the interface 102 are generic and parameter driven, but the device framework 104 uses the parameters provided by the interface 102 to invoke the selected device handler 112, 114, 116 and perform the specific function of the peripheral device 120, 122, 124 through the device handler.

The device handlers 112, 114, 116 may be dynamic-link libraries (DLL) files, which are commonly used as drivers for peripheral devices 120, 122, 124. The DLL file acts as a translator between the computer system 100 and the peripheral devices 120, 122, 124. In the exemplary embodiments, the device handlers 112, 114, 116 act as a translator between the device framework 104 and the peripheral devices 120, 122, 124.

The device handlers 112, 114, 116 may be generic, vendor specific, or model specific. A vendor may have a common communication protocol for all of its devices, and so a device handler for one vendor may communicate with all of its devices. For example, if Company A manufactures several different models of web cameras, and all of the models have the same communication protocol, one device handler may suffice to communicate with all web cameras manufactured by Company A. Alternatively, each web camera model may have a unique way of communicating with the computer system 100. In this case, a device handler for each web camera model may be necessary. In either situation, the vendor produces the device handlers 112, 114, 116 internally and packages the device handling protocols with the peripheral devices 120, 122, 124. By invoking the communication included in the device handlers 112, 114, 116 created by the peripheral device vendors, the device framework 104 may easily be updated with additional or new peripheral devices 120, 122, 124 simply by updating the configuration of the device framework 104.

ActiveX performs a number of preferred functions in order to dynamically call device handlers 112, 114, 116 for a plurality of different peripheral devices 120, 122, 124. ActiveX allows for cross-platform communication, for example across the Windows® operation system to Java, which may be running on the peripheral devices 120, 122, 124. Also, ActiveX is a protocol that can be used in the .NET framework, and can support many other platforms. Because the peripheral devices 120, 122, 124 may operate on a number of different platforms and communication protocols, ActiveX allows for reusable software components independent of programming language. Thus, ActiveX can form a bridge between many different platforms.

Figure 2:
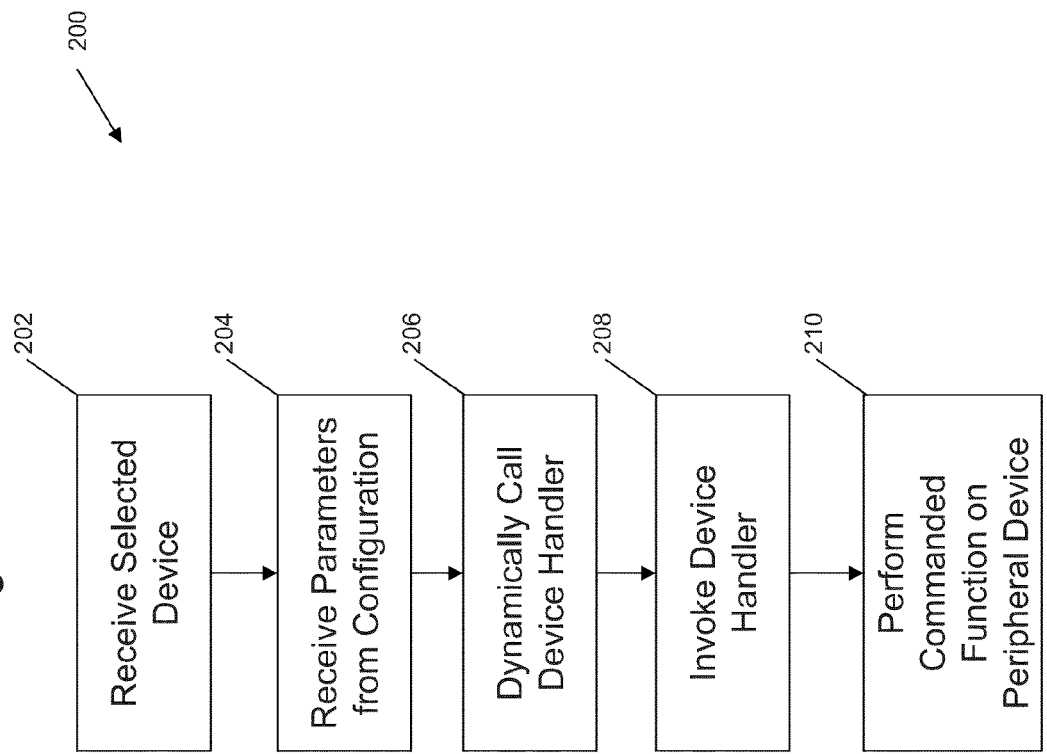
FIG. 2 illustrates a flow chart for dynamically calling a device handler to communicate with a peripheral device according to an exemplary embodiment.

A method of communicating with a peripheral device 120 is illustrated in FIG. 2. Referring to FIGS. 1 and 2, the method 200 begins at step 202 where the interface 102 receives a selected peripheral device 120 from the user. For example, the user may select a web camera manufactured by Company A because the computer system 100 contains that type of web camera. Once the interface 102 receives the selected peripheral device 120, the device interface 104 refers to the configuration of the device framework 104 to find the class for the selected peripheral device 120 in step 204. Referring to the configuration allows the device framework 104 to look up the included commands for the selected peripheral device 120 and also find the device handler 112 for the selected peripheral device 120. The configuration includes a location of the device handler 112, and the device framework 104 uses the location to dynamically call the device handler 112 in step 206. After calling the device handler 112, the device framework 104 invokes the protocols of the device handler 112 in step 208. Using the protocols in the device handler 112, the device framework 104 communicates with the selected peripheral device 120 and perform the commanded functions of the peripheral device 120 in step 210. For example, the commanded function may be to capture an image with the peripheral device 120.

The device framework 104 can invoke quality handlers 132, 134 from a quality layer 130 as well. For example, after an one of the peripheral devices 120, 122, 124 captures an image, the device framework 104 may call a quality handler 132, 134 to determine the quality of the captured image. The quality handlers 132, 134 may perform a number of image quality tasks to ensure that the captured image meets certain quality standards, which may be set by the biometric industry. The quality handlers 132, 134 are capable of providing token images, providing quality feedback, extracting templates for a match, performing, one-to-one biometric authentication, and other image quality tasks.

When the device framework 104 calls an image quality task, the device framework 104 receives a command for a specific image quality task, and the device framework refers to the configuration to find a location of one of the quality handlers 132, 134 corresponding to the called image quality task. The device framework 104 references a quality framework (not illustrated) included in the device framework 104 to dynamically call the quality handlers 132, 134 and invoke the protocols for the quality handler 132, 134 to perform the image quality task.

Biometric systems use high quality images for accurate identification to achieve high security. Thus, the device framework 104 calls one of the quality handler 132, 134 to, for example, determine the quality of the captured image. The quality handler 132, 134 may report the image quality as a score on a scale, for example, of 1 to 100. If the quality is below a predetermined threshold, then the device framework 104 may capture another image with one of the peripheral devices 120, 122, 124. The quality score task is an example of a function of one of the quality handlers 132, 134, but the quality handlers 132, 134 may perform other image quality tasks as well.

A first screen shot of the interface is illustrated in FIG. 3. In FIG. 3, an application window 300 is illustrated. The application window 300 has a select device drop down menu 302. The select device drop down menu 302 lists all of the supported devices currently provided by the device framework. The application window 300 also includes an isConnected button 304 that determines if the selected device, which has been selected from the select device drop down menu 302, is connected to the computer system. The application window 300 also includes a Connect button 306 that connects the computer system to the selected device, which has been selected from the select device drop down menu 302. The application window 300 further includes a Capture button 308 that captures an image using the peripheral device selected from the select device drop down menu 302. The application window 300 also includes a Disconnect button 310 that disconnects the computer system from the selected device. When a camera has been connected, the interface may display a video stream from the camera in an embedded window 312. The embedded window 312 may also display the captured images after the capture button 306 has been pressed. The window 312 may display a scan, a capture, or other still or moving image, such as a fingerprint, iris, or facial scan. A feedback window 314 may also provide information to a user in text form, such as returning a confirmation message that the selected peripheral device is connected to the computer system.

The settings of the device may be configured by entering information into settings text boxes 316, 318 and clicking a set device settings button 320. In some embodiments, additional buttons may be included to perform additional functions. For example, if a pan or ZOOM feature is configured, the interface may include pan left, pan right, zoom in, and zoom out buttons. Further still, the device framework configuration may also be changed using this interface by entering in new information and confirming the change by pressing a button.

A second screen shot of a web-based interface is illustrated in FIG. 4. The application window 400 has a select device drop down menu 402. The select device drop down menu 402 lists all of the supported devices currently provided by the device framework configuration. The application window 400 also includes an isConnected button 404, a Connect button 406, a Capture button 408, a Disconnect button 410, settings text boxes 416, 418, and a set device settings button 420. The isConnected button 404, the Connect button 406, the Capture button 408, the Disconnect button 410, the settings text boxes 416, 418, and the set device settings button 420 perform the same functions as those described in FIG. 3. The web-based interface further includes a quality score button 430 that displays an image quality score.

As can be seen by the exemplary embodiments illustrated above, using the biometric device protocol described above provides faster integration of new peripheral devices by reducing the amount of time spent by developers to integrate peripheral devices into a biometric system. The methods described above ensures better performance and better support for multiple peripheral devices, while still providing a user friendly interface. Biometric systems do not need to be tied to a single vendor or a few vendors because new peripheral devices can be quickly and easily integrated without writing many lines of code.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing," or "computing" or "calculating" or "determining" or "displaying" or "generating" or "synchronizing" or "outputting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method for communicating with peripheral devices comprising:
    loading, by a computer, a configuration file specifying supported peripheral devices and defining commands for each supported peripheral device;
    providing, by a computer, a list of one or more peripheral devices to an interface configured to present the list of one or more peripheral devices;
    receiving, by a computer, a selection of a peripheral device from the list of one or more peripheral devices presented in the interface;
    calling, by a computer, a device handler for the selected peripheral device;
    invoking, by a computer, protocols for the selected peripheral device that are specified by the device handler corresponding to the selected peripheral device; and
    sending, by a computer, commands entered through the interface to the selected peripheral device using the invoked protocols of the device handler corresponding to the selected peripheral device.

2. The computer-implemented method of claim 1, further comprising:
  determining, by a computer, whether the selected peripheral device is connected to the computer before sending the commands entered through the interface to the selected peripheral device using the invoked protocols of the device handler corresponding to the selected peripheral device.

3. The computer-implemented method of claim 1, wherein the supported peripheral devices are a plurality of cameras and scanners from a plurality of different vendors.

4. The computer-implemented method of claim 3, wherein the plurality of cameras and scanners capture images of a face, irises, or fingerprints of a person for a biometric identification recognition system.

5. The computer-implemented method of claim 3, wherein the defined commands in the configuration file comprise a connect command to connect the selected peripheral device to the computer, a capture command to capture an image using the selected peripheral device, and a disconnect command to disconnect from the selected peripheral device from the computer.

6. The computer-implemented method of claim 5, wherein the defined commands in the configuration file further comprise pan left and pan right commands to pan the selected peripheral device right and left, and zoom in and zoom out commands to zoom the selected peripheral device in and out.

7. The computer-implemented method of claim 5, further comprising:
  streaming, by a computer, a video feed from the selected peripheral device after the selected peripheral device has been connected.

8. The computer-implemented method of claim 3, wherein the captured image is received as a JSON object.

9. The computer-implemented method of claim 1, wherein the configuration the comprises an XML file.

10. The computer-implemented method of claim 1, wherein the interface is executed using the ActiveX framework.

11. The computer-implemented method of claim 1, further comprising:
  sending, by a computer, a command to capture an image to the selected peripheral device based on the invoked protocols included in the device handler corresponding to the selected peripheral device;
  receiving, by a computer, the captured image from the selected peripheral device;
  calling, by a computer, an image quality determining device handler;
  invoking, by a computer, protocols of the image quality determining device handler;
  determining, by a computer, the quality of the captured image using the protocols of the image quality determining device handler; and
  displaying, by a computer, an image quality score of the captured image in an embedded object of the interface.

12. The computer-implemented method of claim 11, further comprising:
  sending again, by a computer, the command to capture an image to the selected peripheral device based on the invoked protocols included in the device handler corresponding to the selected peripheral device if the image quality score is below a threshold.

13. A non-transitory machine-readable storage medium storing a computer program product configured to perform:
  providing a system, wherein the system comprises distinct software modules, and wherein the distinct software modules comprise an interface module, a device framework module, and a device plug-in module, and wherein the device plug-in module comprises a plurality of device handlers for communicating with a plurality of supported peripheral devices;
  parsing, by the device framework module, a configuration file that specifies all the supported peripheral devices and defines commands for each supported peripheral device, wherein the parsing of the configuration file generates a list of the supported devices that is provided to the interface module;
  displaying, by the interface module, the list of the supported peripheral devices on a display connected to the system so that a user may select one of the supported peripheral devices for communication between the system and the selected peripheral device;
  receiving, by the interface module, a selection of one of the supported peripheral devices in the list, wherein the received selection is sent to the device framework module;
  searching, by the device framework module, the configuration file to find a location in the computer usable medium of the device handler corresponding to the selected peripheral device;
  calling, by the device framework module, the device handler corresponding to the selected peripheral device from the device plug-in module using the location specified in the configuration file;
  invoking, by the device framework module, protocols for the selected peripheral device that are specified by the device handler so that the device framework module can communicate with the selected peripheral device;
  receiving, by the interface module, commands to perform functions of the selected peripheral device, wherein the commands received are sent to the device framework module; and
  sending, by the device framework module, the commands to the selected peripheral device based on the invoked protocols included in the device handler corresponding to the selected peripheral device.

14. The computer program product of claim 13, wherein the configuration file comprises an XML file.

15. The computer program product of claim 13, wherein the interface module is executed using the ActiveX framework.

16. The computer program product of claim 13, wherein the device hander comprises a dynamic link library file.

17. The computer program product of claim 13, wherein the interface module comprises buttons to be pressed to execute commands, the buttons comprising:
  an isConnected button that determines if the selected peripheral device is connected to the system;
  a connect button to connect the selected peripheral device to the system;
  a disconnect button to disconnect the selected peripheral device from the system; and
  a capture button that captures an image using the selected peripheral device.

18. The computer program product of claim 13, wherein the interface module comprises embedded objects for displaying information, the embedded objects comprising:
  a streaming object that displays a video stream from the selected peripheral device after the selected peripheral device is connected to the system;

a picture review object that displays a captured image after the selected peripheral device captures an image and the system receives the captured image from the selected peripheral device; and a feedback object that textually displays error messages and success messages in response to the commands.

19. The computer program product of claim 13, further comprising:

determining, by a computer, whether the selected peripheral device is connected to the computer before sending the commands to the selected peripheral device based on the invoked protocols included in the device handler corresponding to the selected peripheral device.

20. The computer program product of claim 13, wherein the system is used to enroll the user in a biometric identity recognition system.

21. A biometric system comprising:

a plurality of peripheral devices for capturing measurable characteristics of people for biometric identity recognition; and a computer system comprising a non-transitory computer readable medium configured to:

load a configuration file specifying supported peripheral devices and defining commands for each supported peripheral device;

provide a list of one or more peripheral devices to a interface configured to display the list of one or more peripheral devices;

receive a selection of one of the supported peripheral devices from a list of peripheral devices presented in an interface;

call a device handler for the selected peripheral device;

invoke protocols for the selected peripheral device that are specified by the device handler; and send commands entered through the interface to the selected peripheral device using the invoked protocols of the device handler corresponding to the selected peripheral device.

* * * * *